Feb. 12, 1963     T. A. BYLES     3,077,558

VOLTAGE REGULATOR

Filed July 5, 1960

*INVENTOR.*
*Theodore A. Byles*
BY
Mueller & Aichele
Attys.

United States Patent Office 3,077,558
Patented Feb. 12, 1963

3,077,558
VOLTAGE REGULATOR
Theodore A. Byles, Villa Park, Ill., assignor to Motorola, Inc., Chicago, Ill., a corporation of Illinois
Filed July 5, 1960, Ser. No. 40,711
4 Claims. (Cl. 322—28)

This invention relates to voltage regulating systems, and more particularly to a transistorized voltage regulator particularly adapted for use with electrical generators of automotive vehicles.

Automobile generators are customarily driven at speeds which range from 0 to 6,000 r.p.m. in accordance with vehicle operation, and therefore it is common to use some type of regulator to maintain the output voltage of the generator at a value which does not exceed the voltage rating of an automobile electrical system. Various transistorized voltage regulators have been proposed as advantageous replacements for the contemporary electro-mechanical automotive voltage regulators because, for example, the troublesome mechanical contacts of the latter may thus be eliminated. More generally, a transistorized system offers savings in space, weight and cost over the mechanical regulator.

However, some transistorized generator regulating systems of the prior art use transistors which are directly connected to the field windings of the generator and therefore require two or more transistors in order to provide the correct phase relationship and/or amplification of the control current for proper regulation. There is also the danger, in such prior art systems, that the transistors may suffer damage from current overloading. Other known transistor regulators employ generator output control elements which are expensive or involve other limitations which make them undesirable for use as regulators in automotive electrical systems. Furthermore, in other multi-stage transistorized generator regulator systems employing a single field coil, even though the transistor collector current is reduced to zero the residual magnetism of the field is sufficient to drive the generator to excessive voltage output at high speeds.

Accordingly, it is an object of the invention to provide an improved and more reliable transistorized regulator which requires only one transistor to achieve regulation of automotive electrical generating systems.

Another object is to provide a transistorized regulator for controlling the output of various automobile generators or alternators in a simple and inexpensive manner.

A further object is to provide a transistorized voltage regulator for a generator or alternator which is mountable in a self-cooling position and when so mounted eliminates one slip ring and brush assembly of the generator.

A feature of the invention is the provision of a voltage regulating system employing a single transistor which controls current through an auxiliary winding of a generator to vary the field energization provided by the main windings of the generator.

A further feature is the provision of a transistorized voltage regulating system employing a single transistor which controls current through an auxiliary winding of a generator in which the current in the auxiliary winding may be increased to the point where it cancels the residual magnetism of the field poles, thereby permitting control over output voltage at high rotational speeds.

A still further feature is the provision of a transistorized voltage regulating system for an alternator in which the current to a bucking winding thereof is controlled by a transistor and bias network in which all the components thereof are mounted directly on the rotor of the alternator rather than external to the alternator.

The invention provides a simple, single transistor system for regulating the output voltage of an electrical generator. The transistor may be powered by the generator or other suitable power scources. The gain of the transistor is controlled by biasing connections to a voltage sensing element of a circuit which is responsive to generator voltage variations. This circuit may consist of a voltage divider network connected across the generator output terminals, and includes a Zener diode reverse poled to establish a constant reference voltage. The diode is connected in series with resistance means so that generator output voltage variations thereacross control the current in the transistor base-emitter circuit. Output current from the transistor, in phase with the generator output voltage, is fed through a generator bucking winding which is mounted in inductively coupled relationship with a main field winding of the generator. The direction of the controlled current flowing in the bucking winding is such that it generates a field in opposition to the energizing field, thereby regulating the generator output voltage without the need for phase reversal of the transistor output. The circuit connections and components of the regulating system are well suited for mounting directly on the field winding structure, and when this is the rotating element of the generator, no extra slip rings are needed to make the connections.

Figure 1:
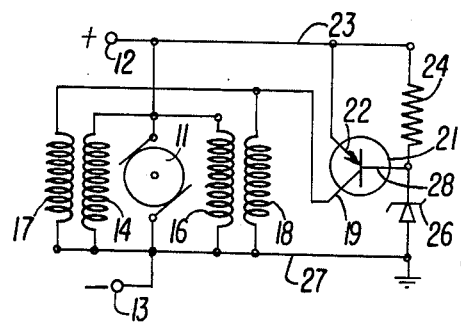
FIG. 1 is a schematic diagram of a generator with a regulator circuit in accordance with the invention.

Referring in more detail to the accompanying drawing, FIG. 1 shows in schematic form a commutator equipped generator 11 of the type adapted to be driven by the engine of an automobile and having D.C. output terminals 12 and 13 for connection to the automobile electrical system. Generator 11 is provided with main field coils 14 and 16 which are shunt connected with the generator armature to provide energizing fields therefor. The field coils may be wound on stationary field poles in the type of generator having an armature designed to rotate between the field poles. In accordance with the invention, each field pole is bifilarly wound, with one winding on each pole connected to serve as main field coils 14 and 16 for the generator, and with the other winding on each pole providing auxiliary windings 17 and 18. Auxiliary windings 17 and 18 thus are physically disposed adjacent the main field windings for effective inductive coupling therewith and have a winding ratio therewith of preferably 1:1, although some variation in this ratio is permissible.

The auxiliary windings are connected in parallel with one another between the negative side of generator 11 and an output or collector electrode 19 of a PNP transistor 21. An emitter electrode 22 of the transistor is connected to a conductor 23 which in turn is connected to positive output terminal 12 of the generator. A voltage divider network including a resistor 24 in series with a Zener diode 26 is connected between conductor 23 and a ground conductor 27 connected to the negative generator output terminal 13. Zener diode 26 is reverse poled with respect to the output polarity of generator 11, and the junction of the diode and resistor 24 is connected to a base electrode 28 of transistor 21. The Zener diode 26 is selected to have a nominal Zener voltage rating somewhat smaller than the maximum voltage desired across the generator output terminals.

In operation, the above circuitry establishes and maintains a maximum generator output voltage. At armature speeds which produce voltages below the Zener breakdown point, practically no current flows in the voltage divider network and therefore transistor 21 is cutoff. In this condition, no current flows through the emitter-collector circuit and the same is true of auxiliary windings 17 and 18. In this range, therefore, the main field windings are fully energized by the armature voltage and the generator is operated in an unregulated condition. When the armature is driven at sufficient speed to produce a voltage slightly above the nominal Zener voltage, the Zener diode breaks down and reverse conduction occurs across the junction interface. As is well known in the art, it is only necessary that the supply voltage exceed the Zener voltage by some useful amount, usually only a few tenths of a volt. In accordance with the well known Zener phenomena, at applied voltages greater than the breakdown point the voltage drop across the diode junction becomes essentially constant for a relatively wide range of currents. Resistor 24 functions as the supply or ballast resistor to drop the supply voltage to the value of the nominal Zener voltage. Since the input circuit of transistor 21 is connected across resistor 24, and since variations in the generator output voltage applied to the voltage divider network are reflected across this resistor, the base-emitter current of the transistor varies directly with the output voltage and hence the much larger emitter-collector current is likewise controlled. This amplified output current from the transistor, drawn in this case from the generator, flows through auxiliary windings 17 and 18 in a direction which opposes or bucks the current flow in the main field windings 14 and 16. As a result, the field magnetizing force generated by the field coils is reduced due to the cancelling effect of the bucking field generated by the current in the auxiliary or bucking windings, tending in turn to de-energize the armature. Accordingly, the output voltage of the generator is rapidly stabilized at a voltage slightly above the Zener voltage when it is being driven above the unregulated speed range.

Figure 3:
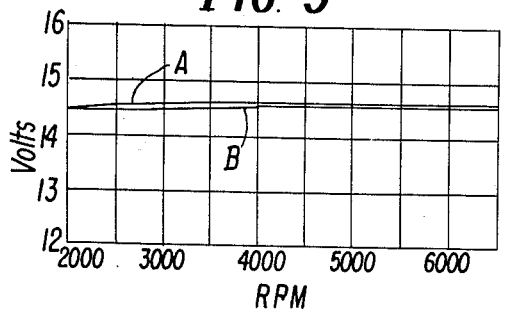
FIG. 3 is a graph illustrating the output voltage of an auto generator as a function of its r.p.m. when regulated in accordance with the circuitry of FIG. 1.

In one system constructed in accordance with FIG. 1, a standard 12 volt automobile generator with two field poles was used. Each pole was removed and bifilarly wound so as to occupy no more space than the previous single field winding. Resistor 24 had a value of 47 ohms, while Zener diode 26 had a nominal Zener voltage of 15 volts and a power rating of at least 1.5 watts. Transistor 21 was a type 2N1166. The voltage across the output terminals 12 and 13 was found to remain essentially constant for both a two ampere load and a twenty-five ampere load. This performance of the regulator is shown graphically in FIG. 3, where it is seen by following curve A that the output voltage varied .2 volt between 2,000 and 3,500 r.p.m. for the 2 ampere load and then remained at 14.7 volts as the speed of the armature was increased above this point. A similar result was obtained with a 25 ampere load, as shown by curve B.

Figure 2:
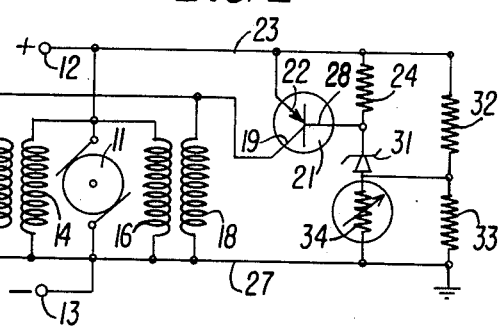
FIG. 2 is a schematic diagram of a generator with a modified regulator circuit also in accordance with the invention.

FIG. 2 shows a modified form of the invention for controlling D.C. generator 11. Those elements which are identical in structure and operation with the elements of FIG. 1 are given identical reference numerals and their description not repeated. The voltage sensing network in this regulating system consists of resistor 24 connected in series with a Zener diode 31 having a lower nominal Zener voltage rating than that of Zener diode 26 of FIG. 1. An additional voltage divider network consisting of a resistor 32 in series with another resistor 33 is connected across the output terminals of the generator. This network provides the correct voltage across the lower rated diode 31 for the same generator output since resistor 24 and diode 31 are connected across only resistor 32 of the voltage divider. The base-emitter circuit of the transistor is again in parallel with resistor 24 since base electrode 28 of transistor 21 is connected to the junction of the diode and resistor 24. In addition, a thermistor 34 is connected across resistor 33 in order to provide temperature compensation according to the requirement of the vehicle storage battery under various climatic conditions.

Figure 4:
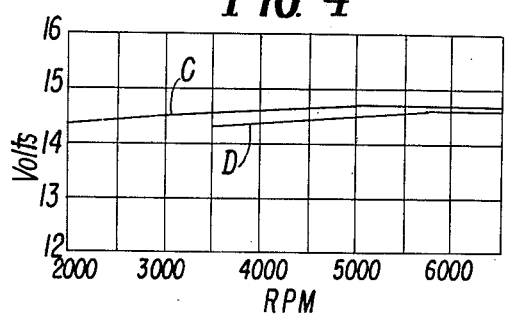
FIG. 4 is a similar graph showing the performance of the modified circuitry of FIG. 2.

The operation of the circuit of FIG. 2 is quite similar to that of FIG. 1, with no regulation occurring until the voltage across resistor 32 exceeds by a given amount the Zener breakdown voltage of Zener diode 31. When diode 31 is conducting in the Zener region, variations in output potential of the generator will be reflected in the base-emitter current of the transistor which in turn controls the emitter-collector or transistor output current supplied to the bucking windings and, consequently, the de-energization of the generator. Referring to FIG. 4, curves C and D illustrate the performance of the lower rated Zener diode in providing regulation for system loads of 2 and 25 amperes respectively. It will be noted that these curves are close to those for the uncompensated Zener diode circuit of FIG. 1.

Figure 5:
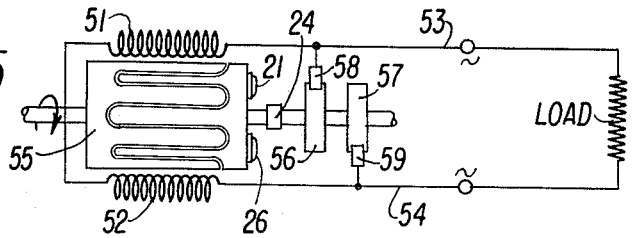
FIG. 5 is a simplified showing of an alternator with the regulator components of the invention mounted on the rotor thereof.

FIG. 5 illustrates the regulator components connected, for example, according to the circuitry of FIG. 1 and applied to an alternator-type generating unit. The application of the regulator to this alternator illustrates its adaptability to a generating device employing the "inside-out" construction typical of alternators. Thus, instead of a rotating internal armature, the alternator load windings 51 and 52 are external and stationary, and are connected in series with load conductors 53 and 54. The internal rotating structure of the alternator carries a field pole and winding assembly 55. The main field windings of this assembly are again connected across the output terminals of the generating device, but in this instance the connection is made by means of slip rings 56 and 57 and their respective brushes 58 and 59 which are connected to conductors 53 and 54 respectively. This type of connection to the rotating fields provides, of course, an A.C. output in the manner of conventional alternators.

Instead of mounting the regulator of the invention externally to the alternator, which would require a third slip ring for connection to the auxiliary windings, the components of the regulator are mounted directly on the rotor of the alternator as shown in FIG. 5. Transistor 21 is mounted opposite Zener diode 26 to provide dynamic and static balance, while resistor 24 may be made in hollow circular form for concentric, balanced mounting on the shaft of the rotor. Since the regulator components need only be connected to each other, to the bucking windings and across the alternator output, it will be seen that these connections are facilitated when the regulator is thus mounted on the rotor.

It will be apparent from the foregoing description that a regulator provided in accordance with the invention requires only one transistor, since regulation is achieved without phase reversal problems by simply connecting the output current of the transistor in the proper direction through the bucking windings of the generating device. In contrast to prior single field coil multiple transistor regulators employing transistors in series with the field coil, here the main field is connected directly across the battery. Hence, by eliminating the voltage drop of a series transistor, higher voltage is available for field excitation and consequently charging current will begin to flow at a lower generator speed. Also, since the transistor is not in series with the main field windings, there is no danger of current overloading and thereby damaging the transistor. It is to be understood that, for the circuits of both FIG. 3 and FIG. 1, the transistor and bucking windings may be connected across an alternative power source provided independently of the generator should this be desired.

I claim:

1. In an electrical system the combination including, electrical generating means having output terminals for connection to a load, load winding means for supplying a current to the load, main field winding means connected to said terminal, for establishing an energizing field for said load winding means, and auxiliary winding means mounted inductively coupled with said main field winding means, a transistor having input, common and output electrodes, circuit means providing current variations in direct proportion to changes in voltage occurring across said output terminals, means coupling said input and common electrodes to said circuit means so that the output current of said transistor is varied in direct proportion to the output voltage of said generator, and means coupling said transistor and said auxiliary winding means in series and across said terminals so that the transistor output current is fed through said auxiliary winding means in a direction to generate a field which opposes the energizing field to thereby regulate the voltage applied to the generator output terminals.

2. In an electrical system, the combination including, an electrical generator having output terminals for connection to a load, an armature and main field winding means connected to said terminals with said main field winding establishing an energizing field for said armature, said generator also having auxiliary winding means mounted for inductive coupling with said main field winding means, a current path connected across said output terminals including a constant voltage device and resistance means in series, a transistor having input, common and output electrodes, means coupling said input and common electrode across said resistor means to control the output current of said transistor in direct proportion to the output voltage of said generator, and means coupling said output electrode in series with said auxiliary winding means across said terminals so that the transistor output current is fed therethrough in a direction to generate a field which opposes the energizing field in proportion to said output voltage to thereby regulate the voltage generated across said output terminals.

3. A voltage regulating system for a vehicle electrical system including in combination, a direct current generator driven by the vehicle engine and having output terminals for connection to the electrical system, an armature connected to the output terminals and a plurality of field poles, each of said field poles having a shunt connected field coil wound thereon for energizing said armature and a bucking coil wound thereon for de-energizing said armature, a voltage divider network including a Zener diode in series with temperature sensitive resistance means connected across said output terminals and with said diode being poled to prevent conduction therethrough until the voltage thereacross equals the Zener voltage thereof, a transistor having base, emitter and collector electrodes with said base and emitter electrodes being connected across said resistance means so that increases in voltage across said generator output terminals directly increases the emitter-collector current in said transistor, and means connecting said collector electrode in series with said bucking coils so that the emitter-collector current flows therethrough in a direction to generate fields which oppose the energizing field produced by said field coils to thereby regulate the output voltage of said generator.

4. A voltage regulating system for use in a vehicle electrical system including in combination, electrical generating means driven by the vehicle engine and having output terminals and a rotor with energizing field coil means and bucking coil means wound thereon in inductively coupled relationship, a voltage divider network mounted on said rotor and including a Zener diode connected in series with resistance means, means connecting said network across said output terminals with said diode being reverse poled so that the voltage thereacross is held constant when it exceeds the Zener voltage thereof, a transistor mounted on said rotor and having input, common and output electrodes with said input and common electrodes being connected across said resistance means so that the transistor output current generated when said diode is conducting varies in direct proportion to the potential across said output terminals, and means connecting said output electrode in series with said bucking coil means so that the transistor output current is fed therethrough in a direction to generate a field in opposition to the energizing field produced by said field coil means to thereby regulate the output voltage of said generating means.

References Cited in the file of this patent
UNITED STATES PATENTS

| | | |
|---|---|---|
| 2,095,134 | Hyland | Oct. 5, 1937 |
| 2,703,861 | Judkins | Mar. 8, 1955 |
| 2,862,175 | Guyton et al. | Nov. 25, 1958 |